United States Patent [19]

Pellizzon et al.

[11] 4,153,472

[45] May 8, 1979

[54] PROCESS FOR PREPARING A RED PIGMENTARY IRON OXIDE

[75] Inventors: Tullio Pellizzon, Paderno Dugnano; Luigi Piccolo; Antonio Paolinelli, both of Milan, all of Italy

[73] Assignee: Euteco S.p.A., Sassari, Italy

[21] Appl. No.: 860,104

[22] Filed: Dec. 13, 1977

[30] Foreign Application Priority Data

Jan. 11, 1977 [IT] Italy ............................. 19152 A/77

[51] Int. Cl.² .................................................. C09C 1/24
[52] U.S. Cl. ................................... 106/304; 260/580; 423/633; 423/632
[58] Field of Search ................ 106/304; 423/632, 633; 260/580

[56] References Cited

U.S. PATENT DOCUMENTS

| | | | |
|---|---|---|---|
| 1,793,941 | 2/1931 | Laux | 260/580 |
| 1,849,428 | 3/1932 | Laux | 260/580 |
| 2,866,686 | 12/1958 | Bennetch | 423/633 |
| 3,619,137 | 11/1971 | Ratcliffe | 423/633 |

*Primary Examiner*—Winston A. Douglas
*Assistant Examiner*—J. V. Howard
*Attorney, Agent, or Firm*—J. Harold Nissen

[57] ABSTRACT

This invention describes the preparation of a red pigment of iron oxide from ferrous salts, by simultaneous reduction of organic nitro derivatives.

10 Claims, No Drawings

PROCESS FOR PREPARING A RED PIGMENTARY IRON OXIDE

This invention relates to the preparation of a red pigment of iron oxide from inorganic ferrous salts by a process which includes the simultaneous reduction, by these ferrous salts, of organic aromatic nitro-derivatives.

Reduction of reducible nitrogen aromatic compounds by means of metallic iron in an acid environment, with the production of the corresponding amines and a precipitate consisting of iron oxides with pigmentary characteristics, is known. However, such processes suffer from disadvantages deriving from equipment corrosion due to the physical and chemical corrosive powers of the solutions and suspensions involved.

It is also known to be possible to produce aromatic amines by the reduction of reducible nitrogen aromatic compounds using ferrous salts. However, using such processes, it has not been possible to find the conditions which lead to the precipitation of iron oxides with satisfactory pigmentary characteristics, nor, in particular, has it been possible to find those conditions which would enable a particular required pigment to be produced reliably and reproducibly.

These disadvantages can be overcome by the process according to the present invention, in which the reduction of the aromatic nitro-derivatives (also referred to as 'nitro-compounds') by ferrous salts is accompanied with the production of red iron oxide of high pigmentary characteristics.

This process comprises adding alkali metal hydroxide to an aqueous mixture which is at between 85° C. and its boiling point of ferrous sulphate and at least a stoichiometric sufficiency of an organic aromatic nitro-derivative at an addition rate which maintains the pH of the mixture below 8 and in an amount of up to about 2 moles for each mole of ferrous sulphate, whereby a suspension of $Fe_2O_3$ with a solids content, evaluated as $Fe_2O_3$, of not greater than 110g/l is obtained. More particularly, the present invention relates to the preparation of a red $Fe_2O_3$ iron oxide pigment of spherical form, with an average particle size of the order of 0.1–0.4 microns, from ferrous sulphate, an inorganic base and an organic aromatic nitro-derivative, by a process comprising:

mixing an aqueous solution of ferrous sulphate with an organic aromatic nitro-derivative and, while operating at a temperature between 85° C. and the boiling point of the reaction mixture at atmospheric pressure, feeding into the mixture aqueous alkali metal hydroxide up to a maximum of approximately 2 moles for each mole of ferrous sulphate, the ratio between the moles of alkali metal hydroxide and equivalent of the aromatic nitro-derivative being equal to or less than about 12:1, said feed of aqueous alkali metal hydroxide being gradual to maintain in the mixture a pH of less than 8, whereby a suspension of $Fe_2O_3$ iron oxide pigment with a solids content, evaluated as $Fe_2O_3$, of not greater than 110g/liter, is formed, the pigmentary iron oxide and the aromatic amine then being recovered from the reaction products so obtained. The inorganic salt used for the purposes of the present invention is ferrous sulphate. It is possible to use pure ferrous sulphate, or a mixture which contains ferrous sulphate, such as one deriving from the production of titanium dioxide by the sulphate process. Such mixtures notably contain preponderant quantities of ferrous sulphate in its heptahydrate form and smaller quantities of other sulphates such as magnesium, aluminium, manganese, chromium and titanyl sulphate.

The preferred alkali metal hydroxide is sodium hydroxide, it being the cheapest.

The nitro-derivatives used for the purposes of the present invention are those organic aromatic compounds which contain one or more nitro groups bonded to an aromatic ring. The compound can have one or more aromatic rings, and in the latter instance they can be condensed or not.

Preferably the nitro-derivative is liquid under the operating conditions. It will usually be selected from those defined by the following general formulae:

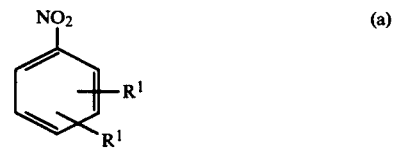

(a)

$R^1$ is the same or different and represents a hydrogen atom, or one of the groups: —OH, —CH$_3$, —NH$_2$, —COOH, —SO$_2$OH and —SO$_2$NH$_2$;

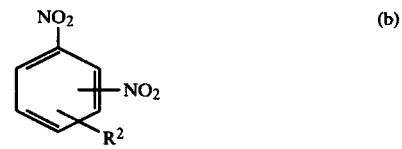

(b)

where $R^2$ represents a hydrogen atom or an alkyl group;

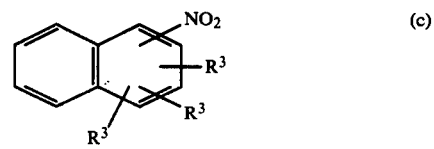

(c)

where $R^3$ represents a hydrogen or halogen atom or one of the groups: —NO$_2$, —NH$_2$, —OH or —SO$_2$OH;

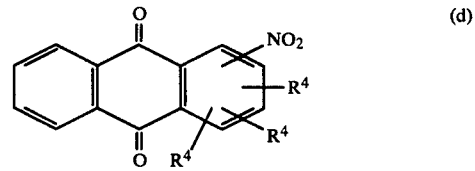

(d)

where $R^4$ represents a hydrogen or halogen atom or an —SO$_2$OH group.

Of these nitro-derivatives, the following are preferred for the process of the present invention: nitrobenzene, p-nitrotoluene, o-nitrotoluene, p-chloronitrobenzene, o-chloronitrobenzene, 2,4-dimethylnitrobenzene, o-nitroanisole, p-nitrobenzoic acid, m-nitrobenzene sulphonic acid, p-nitroaniline and 2,4-dinitrotoluene. According to the present invention, a mixture is prepared consisting of ferrous sulphate in aqueous solution and an aromatic nitro-derivative chosen from those defined above.

This mixture is maintained with agitation at a temperature between 85° C. and its boiling point at atmospheric pressure (typically 102°–103° C.), and aqueous alkali metal hydroxide is gradually added so as to maintain the pH of the mixture at a value always less than 8.

The reactions leading to the formation of the pigment are believed to be the following:

$$18FeSO_4 + 36MOH \rightarrow 18Fe(OH)_2 + 18M_2SO_4 \qquad (I)$$

$$18Fe(OH)_2 + 2ArNO_2 \rightarrow 6(FeO.Fe_2O_3) + 2ArNH_2 + 16H_2O \qquad (II)$$

$$6(FeO.Fe_2O_3) + ArNO_2 + H_2O \rightarrow 9Fe_2O_3 + ArNH_2 \qquad (III)$$

where M is an alkali metal, preferably sodium, and Ar is the aryl moiety of the aromatic nitro compound. Reaction (I) is practically instantaneous, whereas reactions (II) and (III) require a relatively long time. The overall reaction is as follows:

$$6FeSO_4 + 12NaOH + ArNO_2 \rightarrow 3Fe_2O_3 + ArNH_2 + 6Na_2SO_4 + 5H_2O \qquad (IV)$$

In practice, the feed of alkali metal hydroxide takes place at a speed such as to maintain the pH at a variable pH below the value of 8. A typical pH pattern is one which increases during the reaction from an initial value of the order of 3–3.5 to a final value of the order of 5–6. The time required for adding the alkali metal hydroxide is usually of the order of 0.5–1 hour.

After the addition of hydroxide, the heating of the mass continues at the same temperature until the reaction for formation of the red iron oxide pigment is complete. This heating time is typically of the order of 1–3 hours. The maximum quantity of alkali metal hydroxide added is equal or approximately equal to that required for precipitating the iron, and consequently the maximum value of the molar ratio of alkaline hydroxide to ferrous sulphate is approximately 2:1. Beyond this limit, the pH of the medium tends to increase undesirably. The minimum value for the ratio is of the order of 0.5:1. It is inconvenient to fall below this value both of the poor utilisation of the ferrous sulphate and because the precipitate formed is insufficient for the growth of the crystals to the size required for the pigment.

In all cases, optimum results are obtained when operating with a molar ratio of alkali metal hydroxide to ferrous sulphate of 2:1 or at least close to this value.

The amount of nitro-derivative present in the reaction mixture must be at least equal to the stiochiometric quantity for the aforesaid reaction (IV). The usual ratio of moles of alkali metal hydroxide to equivalents of the aromatic nitro-derivative (it will be understood throughout this specification that the nitro compound can have more than one reactive nitro group and due allowance must be made when calculating molar ratios) is thus equal to 12:1. However, the operation may be carried out with an excess of aromatic nitro-derivatives over the stoichiometric value, even though this gives rise to the problem of separation of the excess from the other reaction products.

Best results are obtained when operating in a temperature range of 95° C. to the boiling point of the reaction mixture at atmospheric pressure.

In preparing the pigment, the degree of dilution of the medium in which the operation takes place is important, and in practice the conditions are controlled such that the pigment suspension produced possesses a solids content evaluated as $Fe_2O_3$ of not greater than 110g/liter and more suitably 20 to 110g/liter.

The reaction products obtained in the described manner are a suspension of the pigment in a liquid mixture containing the aromatic amine corresponding to the nitro-derivative used, any unaltered nitro-derivative and an aqueous solution containing dissolved alkali metal sulphate and any unaltered ferrous sulphate.

The separation of this mixture into its individual constituents can be carried out by conventional methods. For example, the organic constituents may be separated by stripping with steam. The residual suspension can be filtered to separate the pigment, and this latter washed with water, preferably acidified water, and then dried.

The residual solution may be processed to recover the inorganic salts contained therein.

As will be evident from the following experimental examples, a pigment can be obtained in this way which is red $Fe_2O_3$ iron oxide in the form of spherical particles with an average sphere size of the order of 0.1–0.4 microns and a narrow particle size distribution. Such pigments have a high tinting strength when this value is evaluated in accordance with ASTM D 387-60.

Embodiments of the process of the present invention will now be described in detail by way of example.

EXAMPLE 1

Ferrous sulphate heptahydrate, obtained as a by-product in the production of titanium dioxide by the sulphate process and having the following composition expressed as percent by weight, is used:

$FeSO_4.7H_2O$ 88.5%; $MgSO_4.7H_2O$ 6.3%; $Al_2(SO_4)_3.18H_2O$ 0.3% $TiOSO_4$ 0.1%; $MnSO_4.5H_2O$ 0.3%; free $H_2SO_4$ 0.5%; $CaSO_4.2H_2O$ 0.2%; free $H_2O$ 3.5%. Traces of $VOSO_4$ (50 ppm) and $Cr_2(SO_4)_3$ (2 ppm) are also present. 1256 grams of the ferrous sulphate heptahydrate (containing 5 moles of ferrous sulphate) are dissolved in water to give a ferrous sulphate concentration of 0.68 moles/liter.

0.84 moles (103.4g) of nitrobenzene are added to the solution and the mixture heated to 99° C. On reaching this temperature, a solution containing 10 moles of sodium hydroxide (400 g) at a concentration of 5 moles/liter is added at a constant rate over 60 minutes with agitation. Thereafter, the temperature and agitation are maintained for a further two hours in order to complete the reaction. The resultant aniline is distilled from the reaction products in a current of steam and the residual mixture is filtered to separate the pigment.

The pigment is washed with a 2% by weight aqueous solution of sulphuric acid, and is then dried. It is subjected to a determination of its tinting strength in accordance with ASTM D 387-60 in comparison with the commercial product SIOF C 1017, and to an electron microscope examination.

The tinting strength is found to be 112, and the microscope examination shows satisfactorily uniform spherical particles of an average diameter of 0.22 microns.

EXAMPLES 2 AND 3 AND COMPARATIVE EXAMPLES 1 TO 3

Example 1 is repeated, varying the operating parameters as shown in Table 1. The table shows for all the Examples and Comparative Examples the following values:

the quantity (moles) and concentration (moles/liter) of the ferrous sulphate (this latter is identical with that of Example 1);

the quantity (moles) of nitrobenzene;

the quantity (moles) and concentration (moles/liter) of sodium hydroxide;

the working temperature (° C.);

the time (minutes) over which the aqueous sodium hydroxide is fed.

Example 2 is carried out in accordance with the invention, and a red $Fe_2O_3$ iron oxide pigment is obtained with a tinting strength of 112, relative to the product SIOF 1017, the pigment is in the form of spherical particles of average diameter 0.22 microns and of good uniformity similar to Example 1.

Example 3 is carried out in accordance with the invention, and a red $Fe_2O_3$ iron oxide pigment is obtained with a tinting strength of 105, relative to the product SIOF C410. The pigment is in the form of spherical particles of average diameter 0.17 microns, of good uniformity.

Comparative Example 1 is comparative in that it is carried out at a temperature outside the indicated range. As a result, an orange precipitate is obtained in the form of a mixture of spherical and acicular particles.

Comparative Example 2 is comparative in that the feed rate of the aqueous sodium hydroxide is such that the pH is taken outside the necessary limit. As a result, a brown precipitate is obtained in the form of heterogeneous particles, many of which are sub-pigmentary and amorphous.

Comparative Example 3 is comparative in that the ratio of moles of sodium hydroxide to the nitrobenzene is outside the indicated limits. As a result, a brown precipitate is obtained in the form of heterogeneous amorphous particles.

TABLE 1

| Example (E) or Comparative Example (CE) | $FeSO_4$ (moles) | (moles/l) | $ArNO_2$ (moles) | NaOH (moles) | (moles/l) | Temp. (°) | NaOH feed (minutes) |
|---|---|---|---|---|---|---|---|
| E1 | 5 | 0.68 | 0.84 | 10 | 5 | 99 | 60 |
| E2 | 5 | 0.68 | 1.0 | 10 | 5 | 99 | 60 |
| E3 | 5 | 2.0 | 0.84 | 10 | 5 | 99 | 60 |
| CE1 | 5 | 0.68 | 0.84 | 10 | 5 | 82 | 60 |
| CE2 | 5 | 0.68 | 0.84 | 10 | 5 | 99 | 15 |
| CE3 | 5 | 0.68 | 0.72 | 10 | 5 | 99 | 60 |

What we claim is:

1. A process for preparing a red pigmentary $Fe_2O_3$ iron oxide of spherical form, with an average sphere size of the order of 0.1–0.4 microns, starting from ferrous sulphate, an inorganic base and an organic aromatic nitro-derivative, comprising:
    mixing an aqueous solution of ferrous sulphate with an organic aromatic nitro-derivative and while operating at a temperature between 85° C. and the boiling point of the reaction mixture at atmospheric pressure, feeding into the mixture aqueous alkali metal hydroxide up to a maximum of approximately 2 moles for each mole of ferrous sulphate, the ratio of moles of alkali metal hydroxide to equivalents of the aromatic nitro-derivative being equal to or less than about 12:1, said feed of aqueous alkali metal hydroxide being gradual to maintain in the reaction medium a pH of less than 8, whereby a suspension of the $Fe_2O_3$ iron oxide pigment with a solids content, evaluated as $Fe_2O_3$, of not greater than 110g/liter, and an aromatic amine are formed, the pigmentary iron oxide and the aromatic amine then being recovered from the reaction products so obtained.

2. A process as claimed in claim 1, wherein the ferrous sulphate is ferrous sulphate heptahydrate obtained as a byproduct from the production of titanium dioxide by the sulphate process.

3. A process as claimed in claim 1, wherein the alkali metal hydroxide is sodium hydroxide.

4. A process as claimed in claim 1, wherein the organic aromatic nitro-derivative contains one or more nitro groups bonded to an aromatic ring of a compound having one or more aromatic condensed or uncondensed rings.

5. A process as claimed in claim 1, wherein the time over which the aqueous alkali metal hydroxide is added is of the order of 0.5–1 hour, and wherein thereafter heating is continued for of the order of 1–3 hours.

6. A process as claimed in claim 1, wherein the reaction is carried out with a molar ratio of alkali metal hydroxide to ferrous sulphate of between 0.5:1 and approximately 2:1.

7. A process as claimed in claim 1, wherein the reaction is carried out at a temperature of between 95° C. and the boiling point of the reaction mixture at atmospheric pressure.

8. A process as claimed in claim 1, wherein a suspension of the iron oxide pigment is produced with a solids content, evaluated as $Fe_2O_3$, of between 20 and 100 g/liter.

9. A process as claimed in claim 3, wherein the organic aromatic nitro-derivative contains one or more nitro groups bonded to an aromatic ring of a compound having one or more aromatic condensed or uncondensed rings.

10. A process as claimed in claim 2, wherein the alkali metal is sodium hydroxide.

* * * * *